United States Patent
Jones et al.

(10) Patent No.: US 6,751,840 B2
(45) Date of Patent: *__Jun. 22, 2004__

(54) WIRELAYING TOOL AND METHOD FOR LAYING A WIRE INTO AN INTERIOR BORE SURFACE OF A CYLINDER

(75) Inventors: Gary Jones, Halifax (GB); Paul Cawrey, Ratby (GB)

(73) Assignee: MSA Engineering Systems Limited, Halifax (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/300,075

(22) Filed: Nov. 20, 2002

(65) Prior Publication Data

US 2003/0101567 A1 Jun. 5, 2003

Related U.S. Application Data

(62) Division of application No. 09/582,484, filed as application No. PCT/GB98/03871 on Dec. 22, 1998, now Pat. No. 6,530,139.

(30) Foreign Application Priority Data

Dec. 24, 1997 (GB) .............................................. 9727159

(51) Int. Cl.⁷ ............................................. B21D 39/00

(52) U.S. Cl. .............................. 29/509; 29/561; 29/566; 29/33 T; 264/279.1

(58) Field of Search .......................... 29/505, 509, 512, 29/561, 566, 33 F, 33 S, 611, 33 T, 432; 264/68, 271.1, 279.1

(56) References Cited

U.S. PATENT DOCUMENTS 6,530,139 B1 * 3/2003 Jones et al. .................... 29/561

FOREIGN PATENT DOCUMENTS

| WO | WO 82/00699 | * 3/1982 |
|----|-------------|----------|
| WO | WO 93/21005 | * 10/1993 |

* cited by examiner

Primary Examiner—David P. Bryant
(74) Attorney, Agent, or Firm—Adams Evans P.A.

(57) ABSTRACT

A wirelaying apparatus and method using a tool (30) having a cutter (31) operatively opening a cut in the interior bore surface (11) of a cylindrical pipe fitting (10), laying wire (12) into the cut and closing the cut using a flange closer (33). The wire (12) is delivered into the cut via an aperture (32) through the cutting means (31). Delivery of the wire (12) into the cut is thereby improved, overcoming the problem of wire running free within the fitting. In a second embodiment (see FIG. 12) the cutter (31) is rotatably mounted allowing a double helical coil to be formed without removing the cutter from the bore surface.

12 Claims, 9 Drawing Sheets

WIRELAYING TOOL AND METHOD FOR LAYING A WIRE INTO AN INTERIOR BORE SURFACE OF A CYLINDER

CROSS-RELATED REFERENCE SECTION

This application is a divisional application of U.S. patent application Ser. No. 09/582,484, filed Aug. 15, 2000 now U.S. Pat. No. 6,530,139, which is a national phase of PCT/GB98/03871, filed Dec. 22, 1998, which claims priority to British SN 9727159.7, filed Dec. 24, 1997, all of which are incorporated herein by reference.

The present invention relates in general to an apparatus and method for laying wire, and in particular but not exclusively to a tool for laying wire into the surface of a body. In a preferred embodiment, the invention relates to a method and apparatus for laying wire into an interior bore-surface of a pipe fitting.

Pipe fittings are commonly used to couple the ends of pipes including, for example, plastics material gas supply pipes. Such pipes must be connected by a sealed joint so that, in use, no gas is permitted to escape through the joint.

One known method of making such a sealed joint is to engage the ends of the plastic-pipes to be joined in a pipe fitting in the form of a cylindrical sleeve. An electrical conductor is embedded in an inner bore-surface of the sleeve, usually in the form of a helical coil of copper wire. When an end of each pipe is positioned in the sleeve, an electrical current is passed through the wire causing the wire to become heated, thereby melting the plastics material on the bore-surface of the sleeve or on the exterior surfaces of the pipes, or both. The end of the pipe thereby becomes fused or welded to the sleeve in a gas-tight sealed joint.

EP-A-0, 569,625 discloses a prior art apparatus for laying wire into the interior bore surface of a pipe fitting, comprising a cutting tool for cutting a groove in the interior surface, a wire guide for guiding wire into the groove, and an enclosing means for returning the cut material back into the groove to enclose the wire.

A problem arises with the prior art apparatus and method in that a separate tool is required for each diameter of pipe fitting, because the shape of the prior art tool closely follows the internal diameter of the pipe fitting. When the wire laying tool is used on an inappropriate size of sleeve, the wire is not correctly laid into the groove and instead tends to run free inside the fitting, rendering the fitting useless.

It is desired to improve the flexibility and reliability of the prior art method and apparatus. Also, in at least a first preferred embodiment, it is desired to provide a method and apparatus for laying wire into a body having a non-constant internal diameter. That is, an is internal diameter that varies along all or part of the length of the body, such as a reducer pipe fitting.

Further, it is desired to provide a method and apparatus for laying wire into a body having a non-useable area, such as a side aperture of a T-shaped pipe fitting. It is desired to lay a single wire along a T-shaped pipe fitting in a helical coil at and near first and second ends thereof but avoiding the side aperture.

Further still, in another preferred embodiment, it is desired to provide an improved method and apparatus for laying a double helical coil of a single piece of wire such that the wire returns to near a starting point.

According the a first aspect of the present invention there is provided a wirelaying apparatus for laying wire into an interior bore surface of a hollow cylinder, comprising: cutting means for making a cut into said interior bore surface; wire guide means for guiding wire into the cut; and enclosing means for closing the cut thereby enclosing the wire in the cut; characterised in that: said wire guide means is arranged such that the wire enters the cut through the cutting means.

Advantageously, the wire enters the cut directly through the cutting means and therefore cannot run free. Preferably, the wire is guided through an aperture in the cutting means ideally to an exterior surface of the cutting means that, in use, faces into the cut.

Preferably, the cutting means is arranged to produce a cut which is substantially normal to said interior bore surface, and in the form of a groove, with said cutting means preferably lifting a flange to one side of the cut. Ideally, the guide means guides the wire into the cut to an area underneath the flange, and preferably a corner position underneath the flange Preferably, said wirelaying apparatus comprises a wirelaying tool integrally forming said cutting means, said wire guide means and said enclosing means. Preferably, said tool is arranged to be carried on an elongate bar, with said wire preferably being fed along the bar, suitably by a wire delivery means such as pulley arrangement, to said wire guide means.

The preferred embodiment is particularly intended for laying wire into the interior bore surface of a plastics material pipe or pipe fitting. Said wirelaying apparatus is preferably arranged to receive said pipe or pipe fitting for rotation about a longitudinal axis thereof with said wirelaying tool being held on said bar against said interior bore surface such that the pipe fitting is operatively rotated with respect to the wirelaying tool.

Preferably, the wirelaying tool is arranged such that said enclosing means is in a plane normal to the longitudinal rotational axis of the pipe fitting. Therefore, maximum pressure may be applied by the enclosing means to close the flap cut by the cutting means even if the tool is used with a pipe fitting having an internal diameter substantially greater than the exterior circumference of the tool. However, the wirelaying tool is preferably arranged to have an exterior circumference corresponding to the interior diameter of an intended pipe fitting.

Preferably, the wirelaying tool is mounted into a receiving recess in said bar such that said tool is carried aligned with an end face and an outer circumferential face of the bar. By mounting the wirelaying tool in this position on the bar, several operational advantages are achieved. In particular, the cutting means is arranged to lie at or near the end of the bar. Placing the cutting tool in this position allows the cutting tool to remain in contact with the interior bore surface even if the internal diameter of the bore surface changes along the length of the pipe fitting, such as in a reducer used to couple pipes of different diameters.

A further advantage of the wirelaying apparatus is that the pitch of the helical path followed by the wirelaying tool may be changed during wirelaying. In particular, the wirelaying apparatus may move the wirelaying tool to greatly increase the pitch of the helical path. This feature is particularly advantageous, for example, in laying a continuous piece of wire within a T-shaped pipe fitting such that the wire may be laid to avoid a side aperture of the T-shaped fitting.

According to a second aspect of the present invention there is provided a wirelaying apparatus, for laying wire into a body, said apparatus comprising a cutting means that is rotatable about an axis substantially normal to an interior bore surface of said body.

The cutting means is preferably provided with a cutting face preferably intended for making a cut, in use, by moving said cutting means through said interior bore surface, in the direction of said cutting face. Advantageously, said cutting means is rotatable, such that said cutting face is rotated about said axis. Preferably, a wire guide means guides a wire through said cutting means along said axis such that said cutting means rotates about said wire.

Advantageously, the cutting, tool is driven in a first direction, to lay wire in a first helical path, is then rotated through substantially 90° and driven to lay wire along a linear path, and then rotated through a further 90°, to lay wire in a second helical path. Preferably, the second helical path lies between said first helical path such that a double helical path is formed.

For a better understanding of the invention, and to show how embodiments of the same may be carried into effect, reference will now be made, by way of example, to the accompanying diagrammatic drawings, in which.

Figure 1:
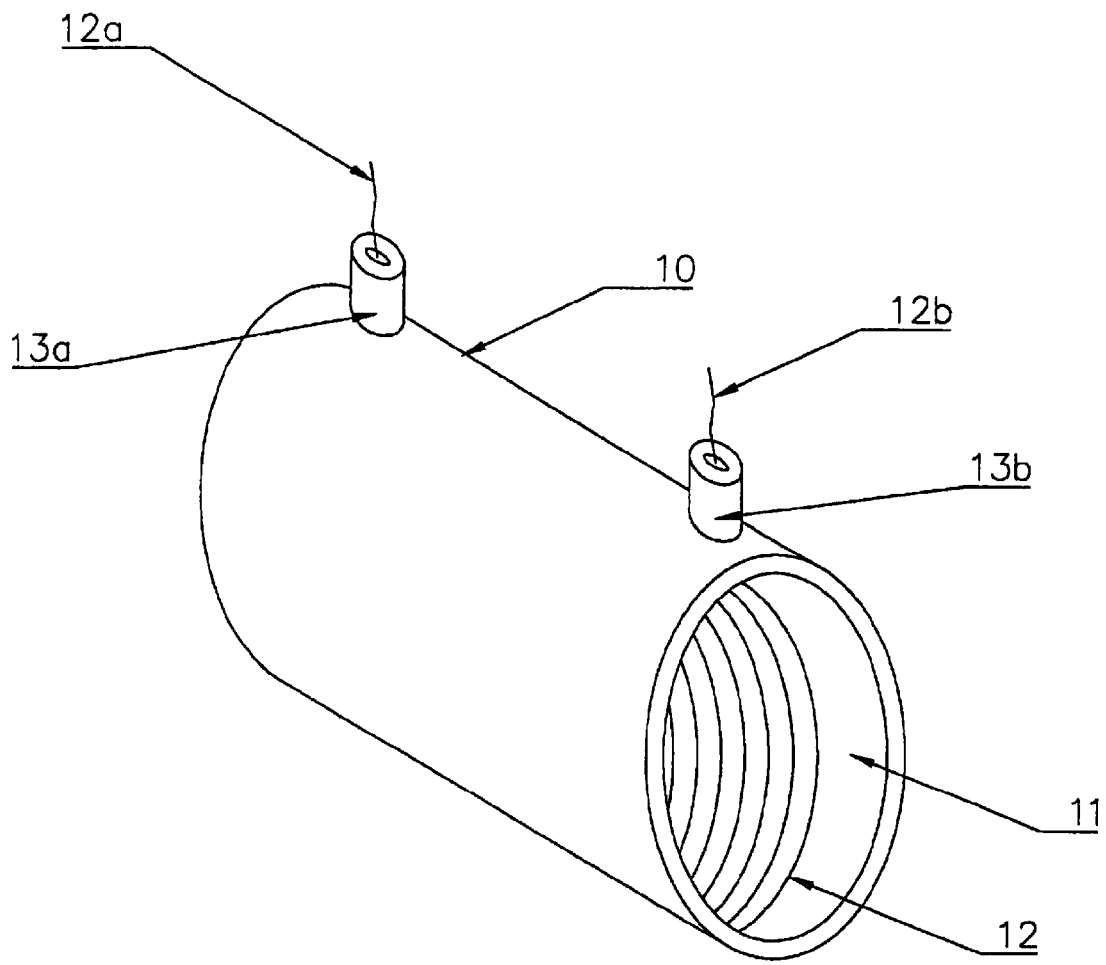
FIG. 1 is a perspective side view of a pipe fitting.
Figure 2:
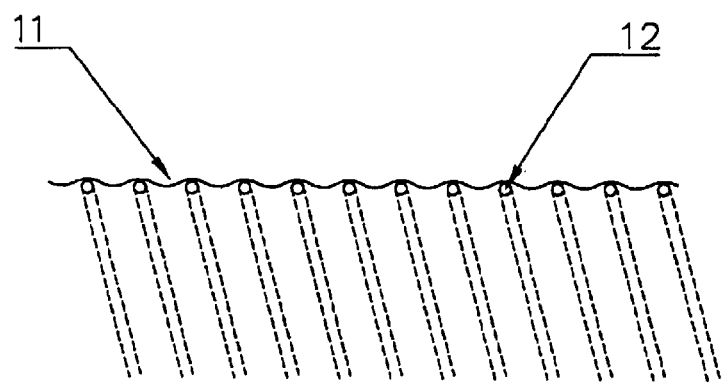
FIG. 2 is a sectional view through the pipe fitting of FIG. 1.

Referring firstly to FIGS. 1 and 2, a pipe-fitting 10 is shown in the form of a sleeve used to connect the ends of pipes such as gas pipes. The fitting 10 is hollow and generally cylindrical and has an inner bore-surface 11. Embedded in the bore-surface 11 is a helical coil of copper wire 12, a first end 12a of which protrudes from a first port 13a on the exterior of the fitting 10 and the second end 12b of which protrudes from a second port 13b on the exterior of the fitting 10.

Referring also now to FIG. 2, this shows, in cross-section, a portion of the bore-surface 11 of the fitting 10 with the helical coil of copper wire 12 embedded therein. The turns of the wire 12 are enclosed by the plastics material of the bore-surface 11 causing the bore-surface 11 to undulate. The wire is securely retained in the bore-surface 11 and is not prone to becoming detached, as has been the case with prior fittings of this kind.

In use, when the fitting is required to connect two plastic pipes (not shown) the ends of the pipes are each inserted in the respective ends of the fitting 10. The diameter of the bore of the fitting 10 is chosen so as to be a friction fit with the pipes which it is to connect. Once the pipes are in position an electrical current is made to flow through the copper wire 12 by appropriately connecting the ends 12a, 12b of the coil to a voltage source. The passage of electrical current through the wire 12 causes the wire to become heated which heat causes the plastic material surrounding the wire 12 to melt. In addition, the heat of the wire at least partially melts the outer surfaces of the pipes. After a predetermined time the current flow in the wire 12 is stopped and the pipes and the fitting are allowed to cool. The result is a welding together of each pipe to the fitting 10 to produce a relatively strong joint. Importantly, the joint is a gas-impermeable seal and so the fitting 10 can be used to sealably connect gas pipes.

Turning now to FIGS. 3 to 7, these show an apparatus for laying the wire 12 in a hollow cylindrical body such as a pipe fitting 10 as shown in FIGS. 1 and 2.

Figure 3:
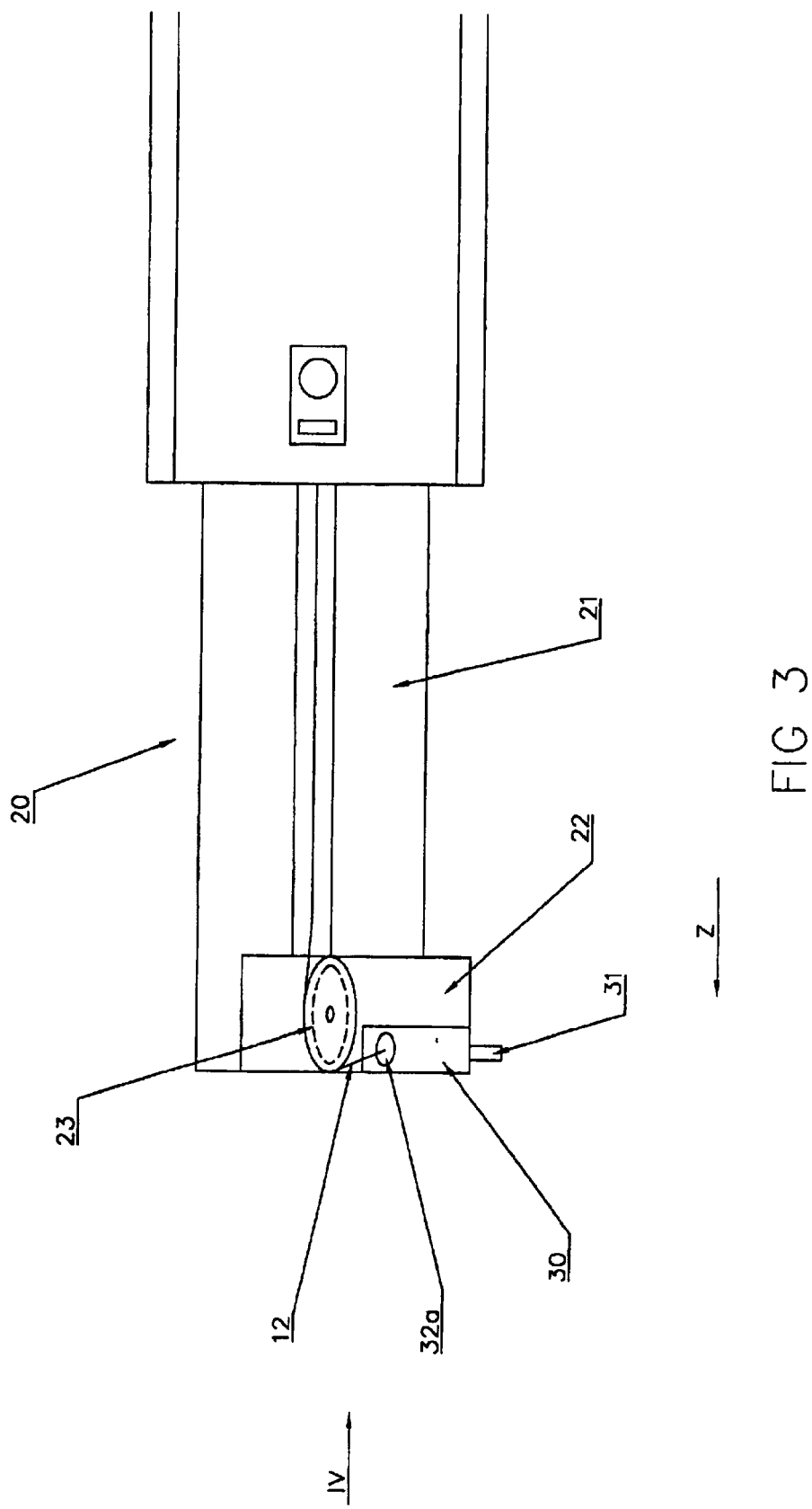
FIG. 3 is a plan view of a wirelaying apparatus.

Referring to FIG. 3, the wire-laying apparatus of the first embodiment comprises a steel head portion 22, and a steel support arm 21 which is connected to and supports the head portion 22.

Mounted on the head portion 22 is a wirelaying tool 30 and a wire supply means including a guide pulley 23 which supplies the copper wire 12 to the wirelaying tool 30 during the wire-laying process. The head portion 22 has an arcuate friction surface which has been flame-hardened and polished. The head portion may also carry a reaming cutter (not shown), such as in a position opposite to said wirelaying tool 30.

In use, a pipe fitting 10 is mounted, for example, on the spindle of a computer-numerically-controlled CNC machine (not shown) and the support arm 21 of the wire laying apparatus 20 is mounted in the tool-holder of the machine.

Optionally, a boring operation is first performed on the fitting 10, using a separate boring (reaming) cutter, or conveniently using a boring cutter carried on the head portion 22 of the wirelaying tool 20.

The CNC machine is suitably programmed to rotate the fitting 10 at a first speed of up to about 2000 revolutions per minute, and to advance the wire-laying apparatus into the bore of the fitting 10 without initially making contact with the fitting 10.

Once the wire-laying apparatus is positioned fully inside the rotating fitting 10, at the end at which the fitting is secured to the spindle, the wire-laying apparatus is manoeuvred so that the boring cutter is made to cut into the inside bore-surface 11 of the fitting 10, to a predetermined depth, and the wire-laying apparatus is slowly withdrawn from inside the bore of the fitting at a predetermined rate, maintaining the cutting of the bore-surface at the predetermined depth, to perform a boring operation. This ensures that the bore-surface is consistently even and is smoothly cylindrical for the wire-laying operation.

Once the head portion 22 is fully withdrawn and any swarf or waste material has been removed, the CNC machine causes the head portion 22 to re-enter the bore of the fitting 10.

The wire-laying operation will now be described in general terms with reference to FIG. 3, and with reference to FIGS. 4 to 7 which show in more detail the wirelaying tool 30 of the wirelaying apparatus 20.

Skilled persons in the field of CNC machines will be familiar with the conventional descriptions of X, Y and Z movements as will be referred to below, with Y designating movement due to rotation of a workpiece relative to a tool, X designating movement in a horizontal plane normal to the axis of rotation of the workpiece, and Z designating movement parallel to the axis of rotation.

For the wirelaying process, the CNC machine causes the fitting 10 to rotate at approximately 50 revolutions per minute and the wirelaying tool 30 is brought into contact with the bore-surface 11 of the fitting 10 to cut a groove therein. The groove is substantially normal to the bore-surface 11 of the fitting 10. By moving the tool 30 at a constant rate in the direction of Z movement as represented by the arrow Z in FIG. 3, combined with constant rotational Y movement of the pipe fitting represented by the arrow Y in FIG. 4, a helical groove of constant pitch is formed.

Figure 4:
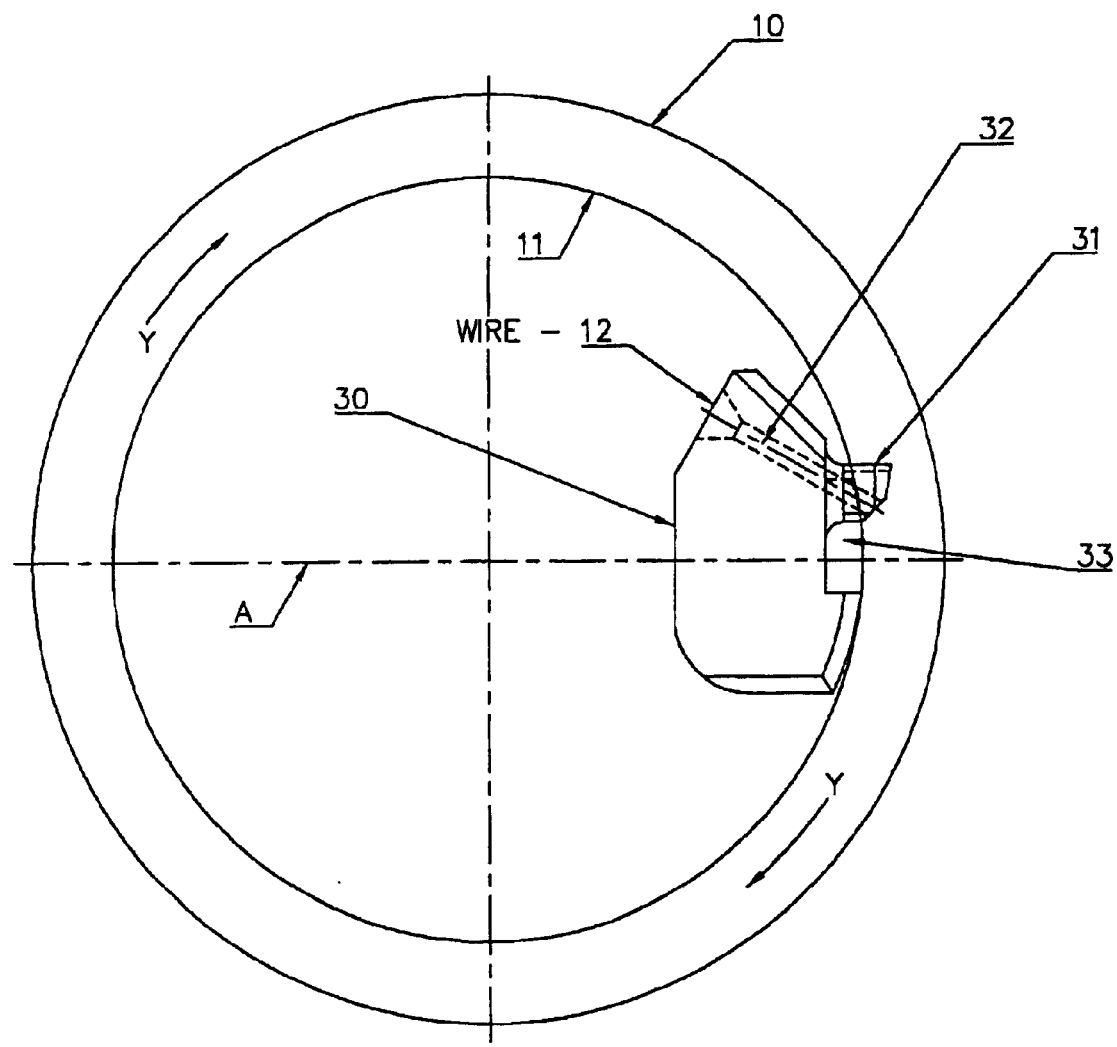
FIG. 4 is an end view of a wirelaying tool in use in a pipe fitting.

Referring to FIG. 4, the preferred position of the tool 30 is shown relative to a pipe fitting 10, with the cutter 31 engaging the interior bore-surface 11. A flap closer 33 is arranged to lie on a plane normal to the axis of rotation of the fitting A, i.e. on the centre line of the fitting, and the cutter lies just above this centre line. Therefore, if the fitting 10 is exchanged for one of a larger diameter, the flap closer still lies close adjacent the bore surface 11. The same tool can be used to lay wire in pipes of different diameters.

As the cutter 31 of the tool 30 cuts a groove in the rotating bore-surface 11 of the fitting 10, a flange of plastics material is displaced to one side of the cutter 31. The wire 12 is fed through a feed aperture 32 in the cutter 31 directly into the freshly cut groove.

The flange of displaced plastics material is guided in a direction substantially parallel to the direction of cutting, to meet a flap closer surface 33 which extends across the tool 30 at an angle of approximately 45°. The flap closer 33 urges the flange towards the opposite side of the freshly cut groove to thereby at least partly cover the laid wire. The flap closer 33 then presses against the displaced material causing it to become heated due to friction. The result is that the displaced material is made to deform and enclose the wire in the cut groove.

The boring of the bore-surface 11, immediately prior to the wire-laying operation, provides the benefit that the bore-surface is still warm from friction caused by the boring cutter when the wire-laying process begins. This assists the further frictional heating of the bore-surface 11 by the flap closer 33 and by a friction surface of the head portion 22 as it causes the displaced plastic material to flow over the wire, thereby embedding the wire in the freshly cut groove.

The continuous process of the wire-laying therefore involves the temporary opening of a groove, the laying or wire in the groove, and the immediate enclosing of the wire in the groove.

Figure 5:
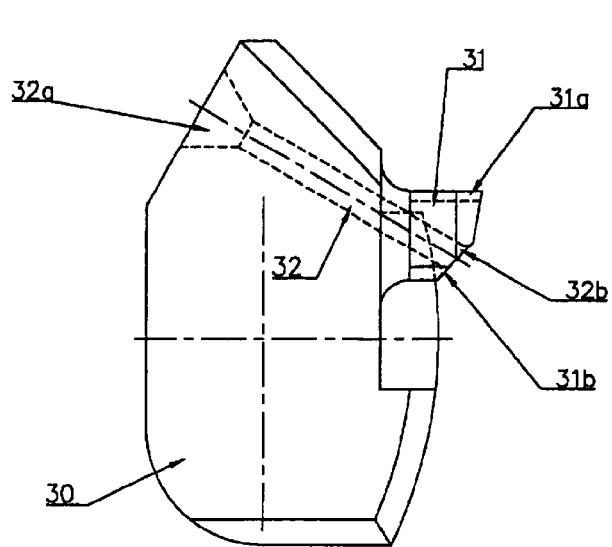
FIG. 5 is a side view of the wirelaying tool.
Figure 6:
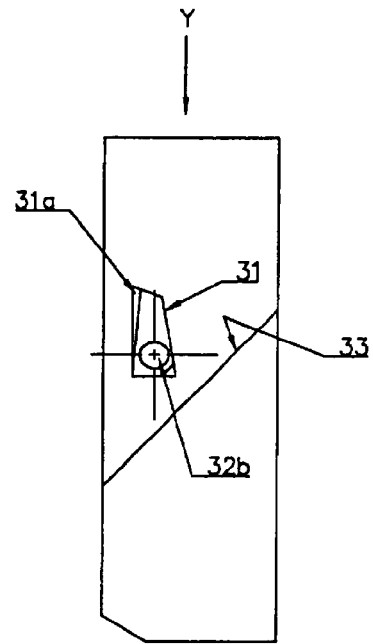
FIG. 6 is a front view of the wirelaying tool.
Figure 7:
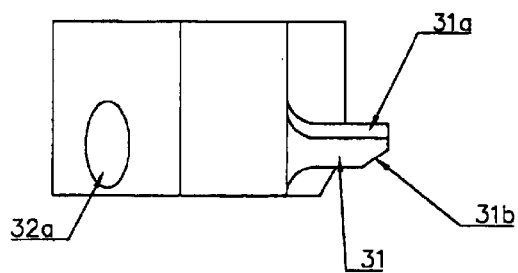
FIG. 7 is a plan view of the wirelaying tool.

Referring to FIGS. 5, 6 and 7, the wirelaying tool will now be described in more detail.

The wirelaying tool 30 is preferably formed by machining a single block of material such as steel to form a cutter 31, a wire guide aperture 32, and a flap closer 33. The wire guide aperture 32 extends from a wide oval shaped opening 32a at the top and rear of the tool 30 at an angle in the range of about 20° to 30° to emerge at an opening 32b in a face of the cutter 31 at the front of the tool.

The cutter 31 is provided with a first angled face 31a leading to a cutting edge, and a second angled face 31b for directing the wire exiting opening 32b toward a desired area of the cut, preferably a strongest corner portion. The cutter 31 is narrower in the region of the first face 31a than at the second face 31b in order to progressively force the cut open.

It will be appreciated that modifications may be made to the apparatus and method without departing from the scope of the invention. For example a CNC machine need not be used to operate the wire-laying apparatus, although it has been found convenient to do so. In addition, the laying of the wire could begin at the end of the fitting 10 closest to the spindle of the machine, with the head portion 14 gradually progressing out of the bore of the fitting 10.

The operation of the wirelaying apparatus to lay wire in a pipe fitting having a variable internal diameter will now be described.

Figure 8:
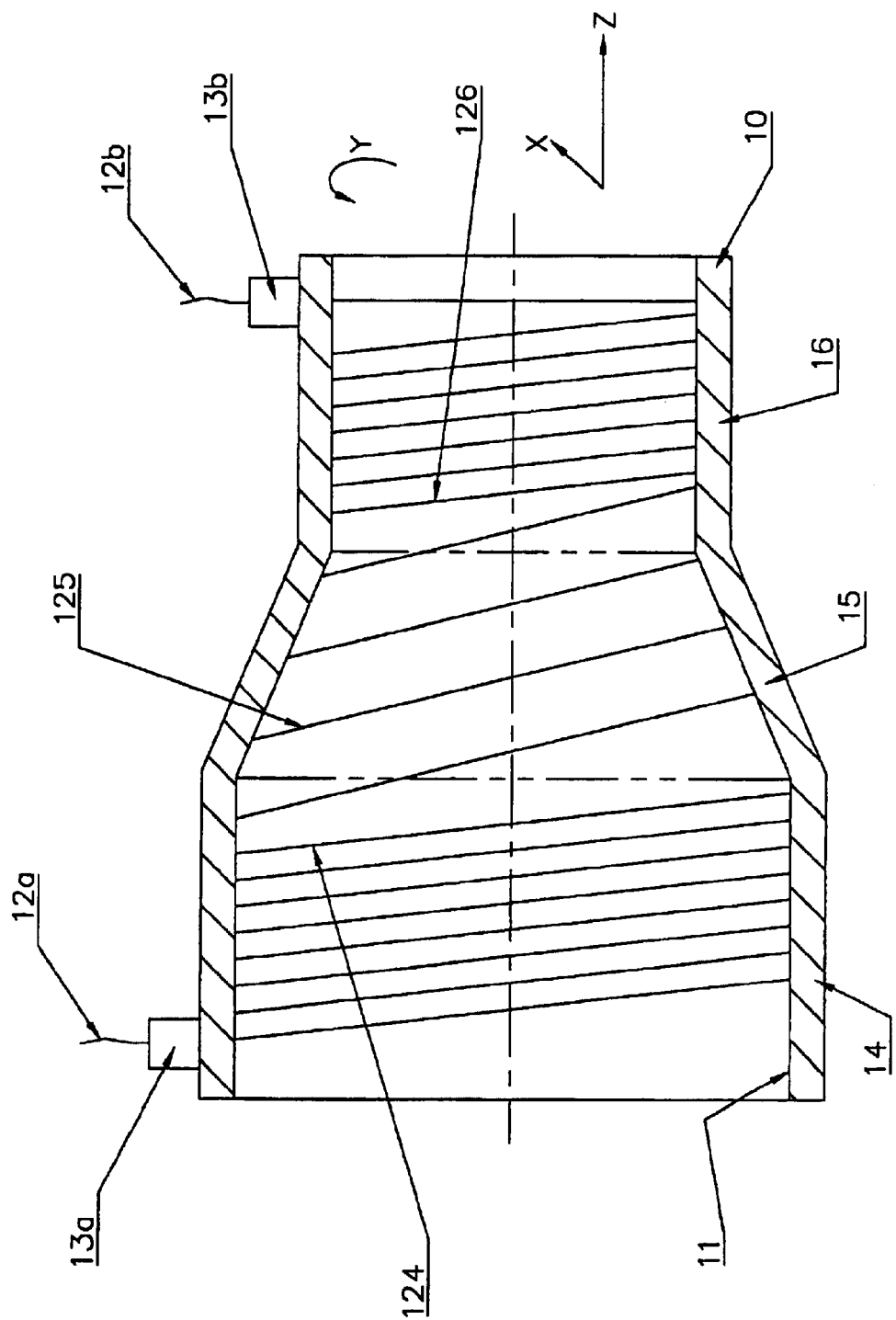
FIG. 8 is a sectional side view of a preferred reducer pipe fitting.

FIG. 8 is a sectional side view of a pipe fitting in the form of a reducer having a first end 14 for receiving a pipe of a first diameter, a second end 16 for receiving a pipe of a second, smaller diameter, and a sloping section 15 therebetween. It is desired to lay a continuous strand of wire from an inlet port 13a to an outlet port 13b. Previously this has not been possible because of the difficulty in correctly laying wire into the sloping section 15.

In operation, the wirelaying tool 31 is carried on the bar 21 into the first end 14 of the fitting and aligned with the first port 13a. The bar 21 is then subject to an X axis move to drive the cutter 31 a predetermined depth into the interior bore surface 11. Next, the pipe fitting is rotated in the direction of arrow Y of FIG. 8, and the tool driven along direction Z to lay wire in a helical coil in a helical groove 124 of a first predetermined pitch. The first coil 124 is laid for a predetermined distance in order to achieve a reliable gas-tight joint in use. The coil does not continue along the entire length of the first section 14 of the pipe fitting 10 because the end portion of a pipe introduced into the first section 14 is particularly vulnerable to over heating, causing unwanted deformation. Therefore, a cold zone is provided by substantially increasing the rate of movement in the Z direction to provide a second helical coil 125, having a relatively large pitch. Once the tool advances to a desired region of the second, smaller, section 16 of the pipe fitting 10, the drive in the Z direction is slowed to provide a third helical coil 126 in the smaller diameter section 16.

As the tool enters the sloping portion 15, an X-direction move is required, i.e. out of the plane of the paper of FIG. 8, in order to follow the reducing diameter of the sloping section. Referring again to FIG. 3, it will be seen that the tool 30 is mounted in a recess at the forward end of the head portion 22 of the bar 21, such that the tool 30 is the first part of the wirelaying apparatus to encounter the sloping surface 15, and therefore the cutter 31 maintains contact with the interior bore surface 11 throughout the sloping section 15. Since the wire 12 enters the cut directly through the aperture 32b in the cutter 31, the wire is reliably laid in the cut and does not run free inside the fitting.

A similar method of operation is used to lay a single piece of wire in a pipe fitting having a non-usable area, such as a T-shaped pipe fitting having a side aperture positioned approximately half way along the length of the pipe fitting. Similar to the arrangement shown in FIG. 8, helical coils 124 and 126 are provided at either end of a T-shaped fitting, and a very large pitch helical coil 125 is used to avoid the side aperture by running the groove in the interior bore surface surrounding and opposite the aperture.

A second preferred embodiment of the wirelaying apparatus will now be described with reference to FIGS. 9 to 13, where like reference numerals are used for parts corresponding to the apparatus described with reference to FIGS. 1 to 8.

Figure 9:
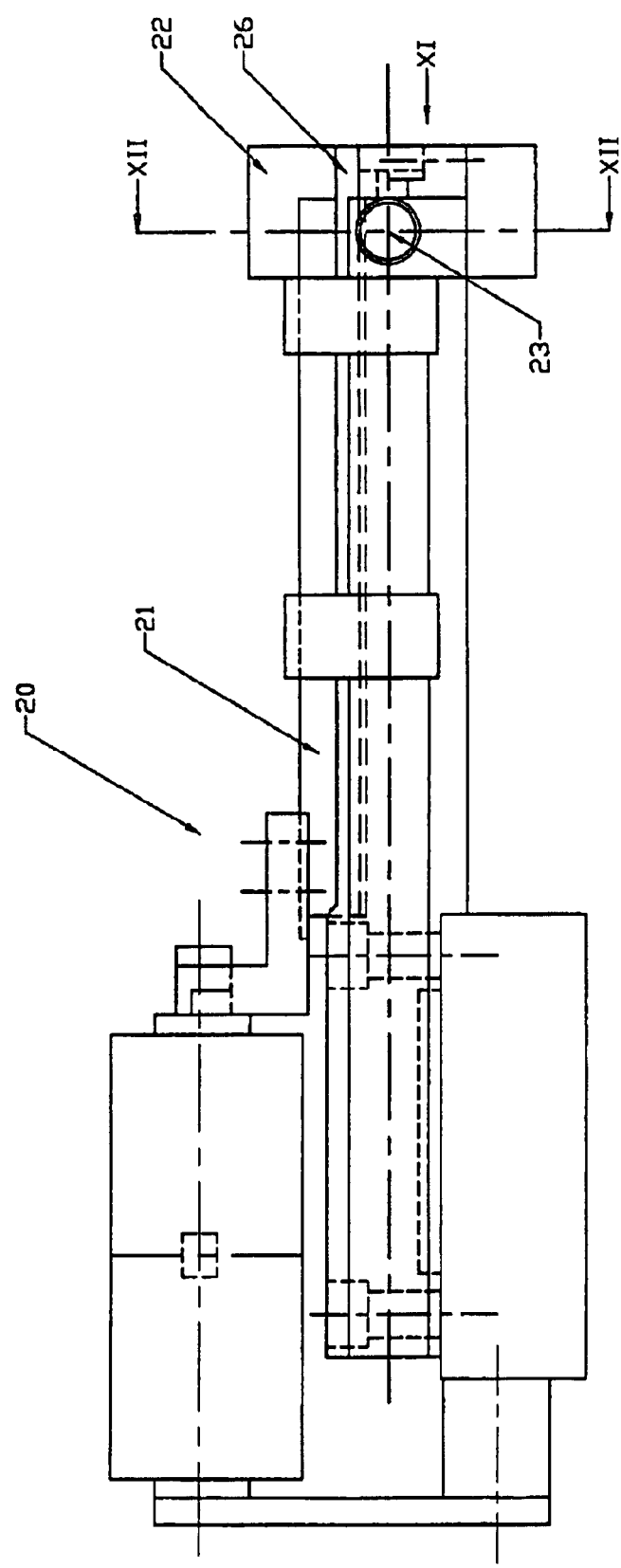
FIG. 9 is a rear elevational view of a second preferred wirelaying apparatus.

FIG. 9 shows a rear elevational view of the wirelaying apparatus 20 having a support arm 21 carrying a head portion 22. In use, wire to be laid is carried along the support arm 21 such as by a pulley arrangement (not shown) to an aperture 23.

Figure 10:
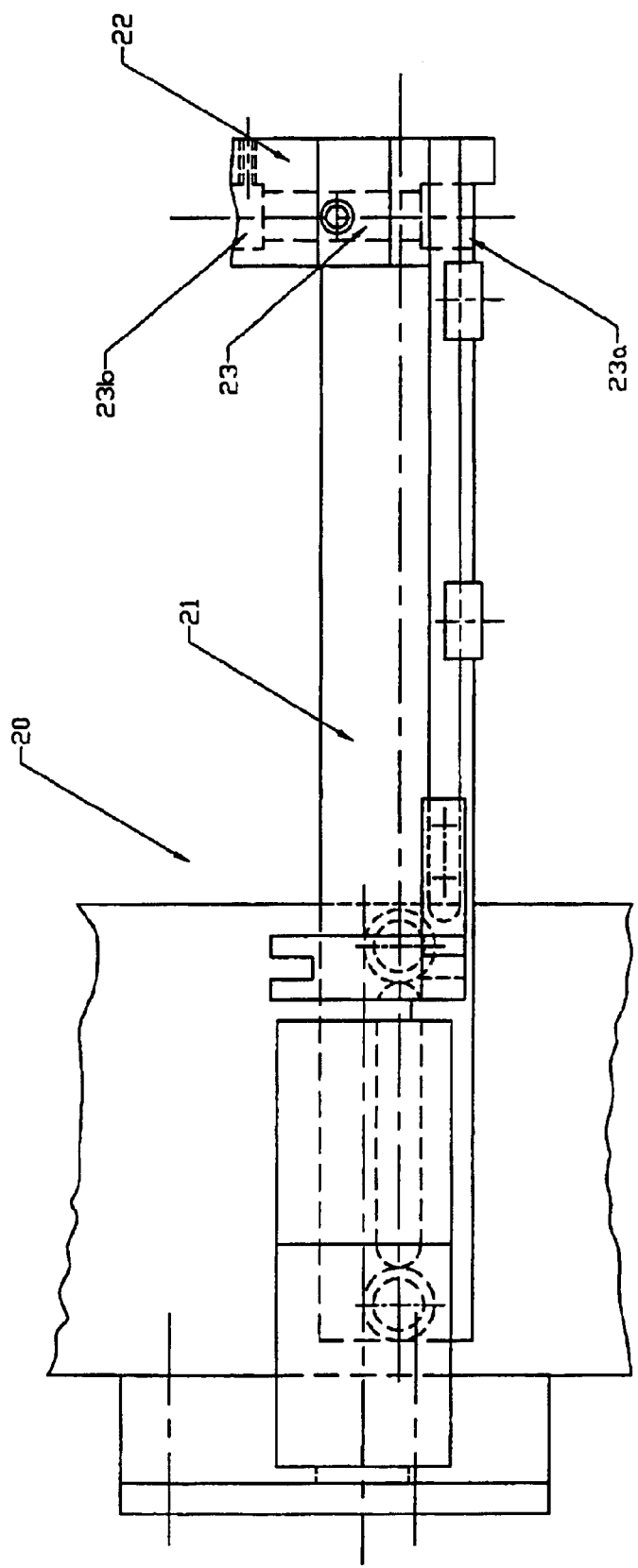
FIG. 10 is a plan view of the apparatus of FIG. 9.

FIG. 10 is a plan view of the apparatus of FIG. 9, showing the aperture 23 passing through the head portion 22 from an entry 23a to an exit 23b.

Figure 12:
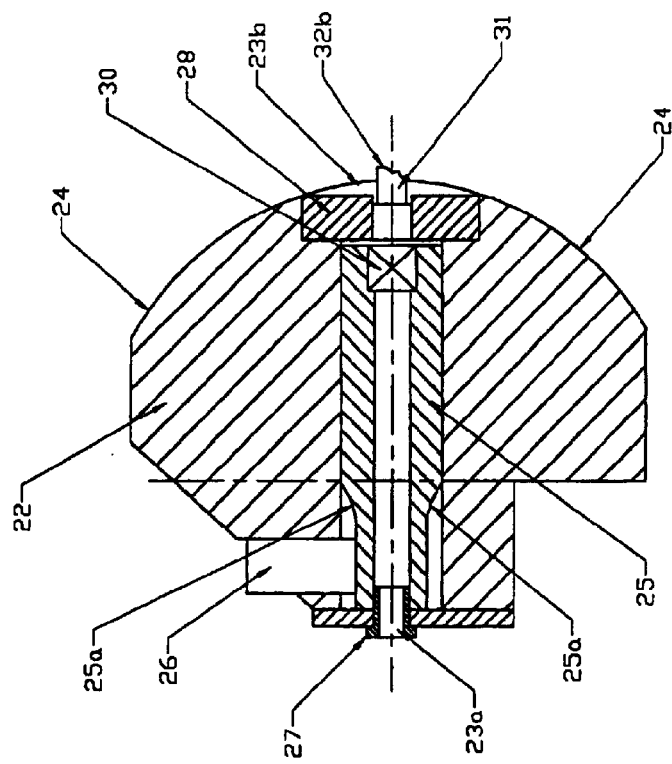
FIG. 12 is a cross-section view through a preferred head portion of the wirelaying apparatus of FIG. 9.
Figure 11:
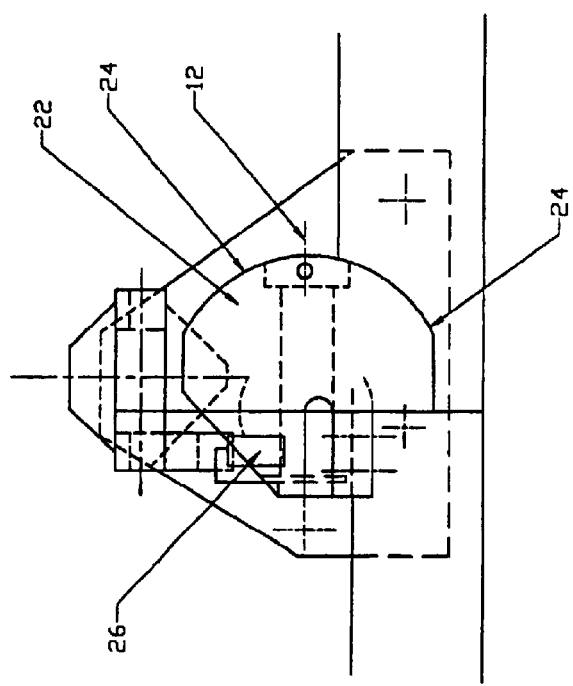
FIG. 11 is an end view of the apparatus of FIG. 9.

FIG. 11 is a end view of the apparatus FIGS. 9 and 10, and FIG. 12 is a sectional view through the head portion 22.

As shown more clearly in FIGS. 11 and 12, the head portion 22 is provided with a curved forward facing pressure or friction surface 24 intended to lie in use against the interior bore surface 11 of a pipe fitting, as in the first embodiment.

A hollow shaft 25 is provided in the aperture 23 having a splined end 25a which acts as a pinion arranged to be engaged with a rack 26 carried on the support arm 21. Longitudinal movement of the rack 26 rotates the hollow shaft 25 within the aperture 23.

A cutter 31 is provided at a forward end of the shaft 25 protruding from the exit 23b of aperture 23. The cutter 31 is preferably non-rotatably received within the interior end 25b of the shaft 25, to rotate with the shaft 25, such as a square cross-section fitting into a corresponding square recess. The rack 26 and pinion 25a arrangement is conveniently sized so as to fit within the confines of the support arm 21 and head 22 and thus fit within a pipe fitting, but any other suitable rotation arrangement may be employed.

In use, a wire 12 to be laid is guided through the hollow centre of the shaft 25, conveniently using a ceramic disc 27 at the entry thereof to reduce friction. The wire 12 passes through the central longitudinal wire guide aperture 32 of cutter 31, to emerge from the cutter 31 directly into the freshly cut groove. Conveniently, the cutter 31 may be rotated about the wire 12, such that the wire may be laid in a groove which changes direction whilst the cutter 31 is engaged in the bore surface 11 of the fitting 10.

The exit 23b of the aperture 23 is provided with a plate 28 having a plurality of flap closers 33 mounted thereon or formed therein. The or each flap closer 33 is arranged to lie rearwardly in the direction of cutting from the cutter 31.

Figure 13:
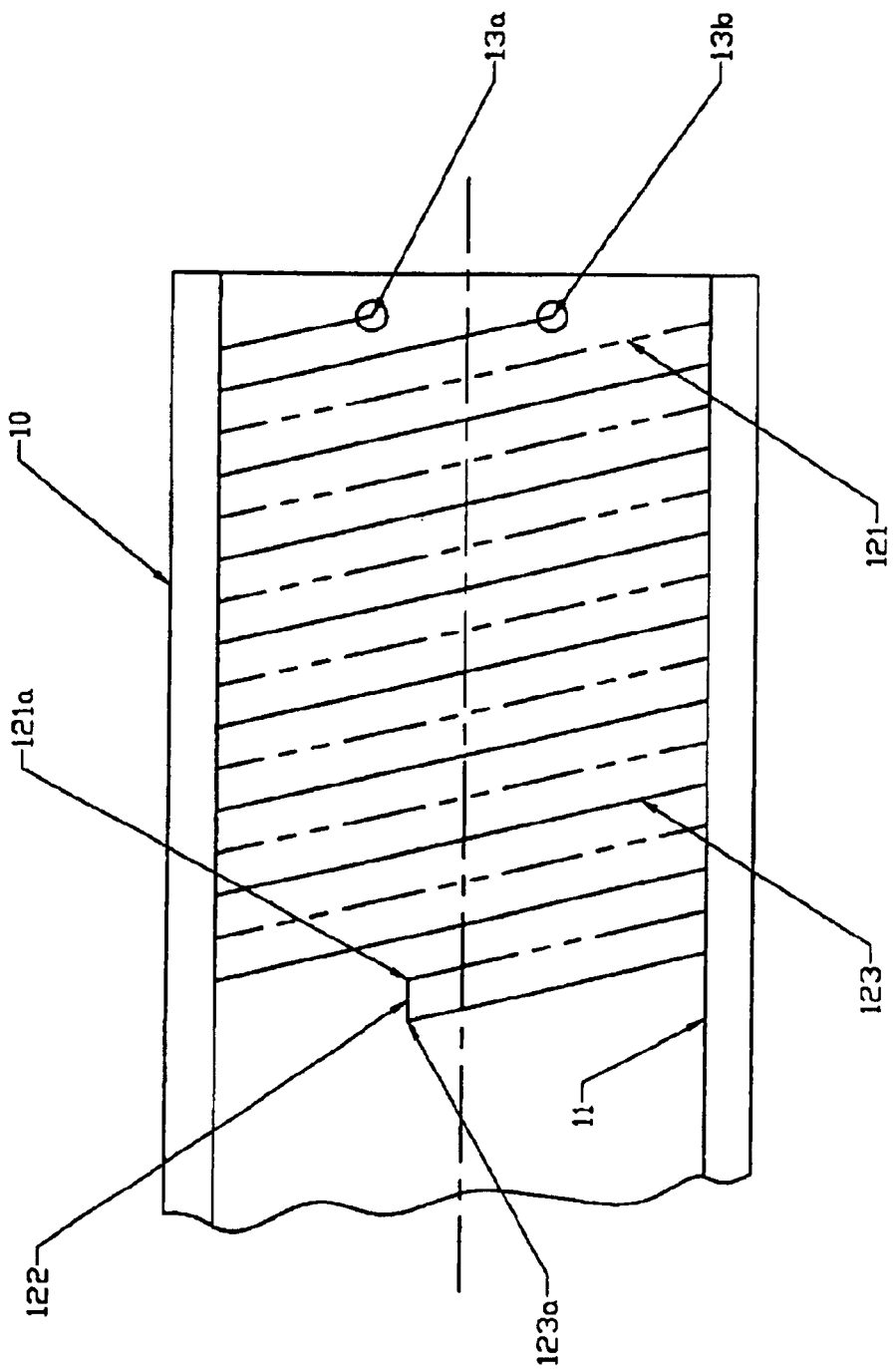
FIG. 13 is a cross-sectional view through a preferred sleeve pipe fitting having a double helical wire coil laid therein.

Referring now to FIG. 13, a preferred method of operation of the apparatus shown in FIGS. 9–12 will now be described.

FIG. 13 shows a section of a pipe fitting 10 where it is desired to lay a single continuous piece of wire 12 in a double helical path from an input port 13a to an output port 13b. This arrangement finds particular application, for example, when it is desired to provide more than one coil arrangement in a pipe fitting so that joints may be made separately, conveniently at different points in time. The double helical coil arrangement may be used with any form of pipe fitting, including a sleeve, reducer, T-shaped, elbow or cap-end pipe fitting.

With reference in particular to FIG. 12 and FIG. 13, the cutter 31 is set to a first direction and driven by suitable X and Z movement of the support arm 21 through the interior bore surface 11 of the pipe fitting 10 which is rotated past the cutter 31, such that wire 12 is laid in a first inward helical coil 121.

At the end of the first helical coil 121, the rotation of the fitting 10 and the movement of the head 22 and arm 21 is stopped. That is, at position 121a of FIG. 13. The cutter 31 is then rotated by means of the rack 26 and the pinion 25a through about 90° to a second desired cutting direction. The wire 12 is laid in the second direction in a linear path without the fitting 10 being rotated, to form a connecting portion 122. The connecting portion is ideally of a length corresponding to one half of the pitch of the first helical coil 121. The tool 31 is then rotated again to a third cutting direction, preferably through about 90° such that the tool has rotated through about 180° from the first cutting direction. By rotating the fitting 10 in the reverse direction and performing a movement in the reverse Z direction of the head portion 22, the cutter 31 scribes a second helical path 123 from the position 123a to the outlet port 13b.

The present invention extends to cover the embodiments of the wirelaying apparatus and the methods of operation of the wirelaying apparatus, as described above, and the pipe fittings produced by said apparatus and methods. The invention extends in particular to the wirelaying tool 30 having a wire guide aperture therethrough for delivering wire directly in to the cut.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A wirelaying apparatus for laying a wire into an interior bore surface of a hollow cylinder, comprising:

(a) a cuffing tool;

(b) an outwardly projecting cuffing tip, including a cylinder-engaging cutting edge, formed on the cuffing tool for forming an elongate cut into the bore surface of the hollow cylinder:

(c) a wire guide for feeding and guiding the wire into the cut in coordination with movement of the cuffing tip relative to the hollow cylinder, the wire guide comprising a wire supply channel extending through the cuffing tip and terminating at a wire guide aperture in an exterior surface of the cuffing tip immediately adjacent the cuffing edge of the cutting tip, the wire guide aperture being positioned in use in the cut for progressively feeding the wire into the cut directly through the cutting tip; and (d) a wire encloser for closing the cut after the wire has been fed into the cut, thereby enclosing the wire in the cut.

2. A wirelaying apparatus according to claim 1, wherein the cutting tip comprises:

(a) a first angled face leading to the cutting edge for cutting the cut into the interior bore surface of the hollow cylinder, the first face lying in use generally perpendicular to the interior bore surface; and (b) the wire guide aperture being formed in a second angled face, the second face in use being presented downwardly into the cut to deliver the wire directly into the cut.

3. A wirelaying apparatus according to claim 1, wherein the cutting tip is angled in relation to the interior bore surface to produce the cut by lifting a flange of material from the interior bore surface, and wherein the wire guide guides the wire into the cut and into an area underneath the flange.

4. A wirelaying apparatus according to claim 3, wherein the wire guide is angled in relation to the interior bore surface to guide the wire into a corner position of the cut underneath the flange.

5. A wirelaying apparatus according to claim 4, wherein the cutting tool and the wire encloser are integrally formed.

6. A wirelaying apparatus according to claim 5, wherein the cutting tool is adapted to be carried on an elongate bar having a wire delivery assembly for delivering wire to the wire guide.

7. A wirelaying apparatus according to claim 6, wherein the cutting tool is mounted into a receiving recess of the elongate bar in alignment with an end face of the elongate bar and aligned with or protruding from an outer circumferential face of the elongate bar.

8. A wirelaying apparatus according to claim 1, wherein the wire encloser is positioned to lie in a plane normal to the longitudinal rotational axis of the hollow cylinder.

9. A wirelaying apparatus according to claim 1 wherein the cutting tool includes an arcuate friction surface adjacent to the cutting tip for frictional heating of the interior bore surface.

10. A wirelaying apparatus according to claim 1 and further comprising a reamer for reaming the interior bore surface of the hollow cylinder.

11. A method for laying a wire into an interior bore surface of a hollow cylinder, comprising the steps of:

(a) providing:
  (i) a cutting tool;
  (ii) an outwardly projecting cutting tip, including a cylinder-engaging cutting edge, formed on the cutting tool for forming an elongate cut into the bore surface of the hollow cylinder;
  (iii) a wire guide for feeding and guiding the wire into the cut in coordination with movement of the cutting tip relative to the hollow cylinder, the wire guide comprising a wire supply channel extending through the cutting tip and terminating at a wire guide aperture in an exterior surface of the cutting tip immediately adjacent the cutting edge of the cutting tip, the wire guide aperture being positioned in use in the cut for progressively feeding the wire into the cut directly through the cutting tip;
  (iv) a wire encloser formed on the cutting tool for closing the cut after the wire has been fed into the cut, thereby enclosing the wire in the cut;

(b) opening a cut in the interior bore surface of the hollow cylinder with the cutting tool;

(c) progressively feeding and guiding a wire from the aperture into the cut directly through the cutting tip at a point immediately adjacent the cutting edge of the cutting tip; and (d) closing the cut after the wire has been fed into the cut, thereby enclosing the wire in the cut.

12. A method according to claim 11, and including the step of reaming the interior bore surface prior to forming the cut.

* * * * *

UNITED STATES PATENT AND TRADEMARK OFFICE
CERTIFICATE OF CORRECTION

PATENT NO. : 6,751,840 B2  Page 1 of 1
DATED : June 22, 2004
INVENTOR(S) : Jones, Gary and Cawrey, Paul It is certified that error appears in the above-identified patent and that said Letters Patent is hereby corrected as shown below:

Column 8,
Lines 39, 40, 41, 45, 47, 49 and 50, please delete "cuffing" and insert -- cutting. --

Signed and Sealed this

Thirty-first Day of August, 2004

JON W. DUDAS
*Director of the United States Patent and Trademark Office*